US012695854B2

(12) United States Patent
Ulman et al.

(10) Patent No.: US 12,695,854 B2
(45) Date of Patent: Jul. 28, 2026

(54) PERSONAL OBJECT WITH MINIATURE INTEGRATED PROJECTOR DISPLAY

(71) Applicant: Tectus Corporation, Cupertino, CA (US)

(72) Inventors: Morrison Ulman, Los Altos, CA (US); Brian Elliot Lemoff, Morgan Hill, CA (US)

(73) Assignee: Tectus Corporation, Cupertino, CA (US)

( * ) Notice: Subject to any disclaimer, the term of this patent is extended or adjusted under 35 U.S.C. 154(b) by 0 days.

(21) Appl. No.: 19/086,072

(22) Filed: Mar. 20, 2025

(65) Prior Publication Data

US 2025/0310493 A1 Oct. 2, 2025

Related U.S. Application Data

(60) Provisional application No. 63/570,573, filed on Mar. 27, 2024.

(51) Int. Cl.
*H04N 9/31* (2006.01)
*G09G 3/32* (2016.01)

(52) U.S. Cl.
CPC ............. *H04N 9/3173* (2013.01); *G09G 3/32* (2013.01); *H04N 9/3194* (2013.01); *G09G 2354/00* (2013.01)

(58) Field of Classification Search
CPC ...... H04N 9/3173; H04N 9/3194; G09G 3/32; G09G 2354/00
See application file for complete search history.

(56) References Cited

U.S. PATENT DOCUMENTS

| | | | | |
|---|---|---|---|---|
| 2015/0185703 A1* | 7/2015 | Tanaka | ................. | G04G 9/0094 |
| | | | | 368/239 |
| 2016/0147081 A1* | 5/2016 | Kilcher | ................ | G02B 26/101 |
| | | | | 359/13 |
| 2017/0208160 A1* | 7/2017 | Kim | ........................... | H02J 7/02 |
| 2021/0223555 A1* | 7/2021 | Lemoff | .............. | G03B 21/2013 |
| 2022/0334639 A1* | 10/2022 | Sanchez | ................. | G06F 3/017 |
| 2024/0045202 A1* | 2/2024 | Woodgate | ............ | G02B 6/0048 |
| 2024/0241479 A1* | 7/2024 | Fuji | .................... | G04B 45/0084 |

* cited by examiner

*Primary Examiner* — Kyu Chae
(74) *Attorney, Agent, or Firm* — Amsel IP Law PLLC; Jason Amsel

(57) ABSTRACT

A personal object such as a ring or wristwatch includes an integrated femtoprojector that operates as a mini viewer. The object includes an object body (such as a ring body or watch head) that may be wearable. A display is inset in the object body and is viewable through a window from a position external to the object body. Projection optics may be inset in the object body in an optical path between the display and the window. The projection optics are structured to magnify images produced by the display such that projected images are focused on a retina of a person when viewed from a viewing distance within a range of zero to two inches. A battery internal to the object body provides power to the display via a bus.

20 Claims, 9 Drawing Sheets

RING 900

MINI VIEWER / FEMTOPROJECTOR 920

DISPLAY 922   WINDOW 924   PROJECTION OPTICS 926

BATTERY 904

PROCESSOR 906

ANTENNA 910

BUS 914

RADIO 908

SENSOR 912

RING BODY 930

WRISTWATCH WITH
MINI-VIEWER
100

MINI VIEWER /
FEMTOPROJECTOR 102

HOUR
MARKER
104

WATCH
HEAD 108

WRIST
BAND 106

WRISTWATCH WITH
MINI-VIEWER
100

MINI VIEWER /
FEMTOPROJECTOR
102

EYEBALL
206

USER VIEW OF
PROJECTED
IMAGE
300

WATCH
ARCHITECTURE
400

402 — WATCH MOVEMENT /
POWER MANAGEMENT

404 — FEMTOPROJECTOR
DISPLAY

406 — SPEECH RECOGNITION

408 — WIRELESS COMM

410 — WATCH CONTROL
SYSTEM

CROSS-SECTIONAL VIEW OF
FEMTOPROJECTOR
500

DISPLAY CHIP 502

OPTICAL
SYSTEM
504

BAFFLE 506

PERSPECTIVE VIEW OF
FEMTOPROJECTOR
610

PERSPECTIVE VIEW OF
FEMTOPROJECTOR
620

PERSONAL OBJECT WITH MINIATURE INTEGRATED PROJECTOR DISPLAY

CROSS-REFERENCE TO RELATED APPLICATIONS

The application claims the benefit of U.S. Provisional Patent Application No. 63/570,573 filed on Mar. 27, 2024, which is incorporated by reference herein.

TECHNICAL FIELD

The disclosure is generally related to displays for small electronic devices.

DETAILED DESCRIPTION

Some people like to wear a traditional fancy wristwatch (e.g. Rolex Submariner, Omega Seamaster, etc.) but they also like the modern functions of smart watch (e.g. Apple Watch, Movado Connect, etc.). It's convenient to be able to receive text messages, see calendar details, maps or weather forecasts on a watch. In one example, a mini viewer is a hardly-noticeable display embedded in a traditional watch. At a glance the watch looks like a conventional watch, but when held close to one's eye the watch projects high-resolution, color images.

A mini viewer may be based on femtoprojector technology developed for contact lens displays. Femtoprojectors and some of their components are described in, for example, U.S. Pat. No. 8,786,675 to Deering (Systems using eye mounted displays), U.S. Pat. No. 10,353,204 (Femtoprojector optical systems) and U.S. Pat. No. 10,388,641 to Martin (Ultra-Dense LED Projector), each of which are incorporated by reference herein. A femtoprojector is a very small projector that is designed to focus an image on a person's retina. A femtoprojector contains a microdisplay, such as an ultra-high-density LED array, and a femtoprojector optical system.

Femtoprojector optics are, in effect, a microscope for viewing a very small display. In one example the microdisplay and the femtoprojector optics fit inside a wristwatch. Only a very small window in the watch is needed to allow a user to see the display. A mini viewer may be included in other small electronic devices such as car keys, greeting cards, rings worn on one's fingers, shoes or other objects which are not ordinarily equipped with electronic displays.

One observes a mini viewer display by holding the mini viewer close to one's eye, usually within about an inch. At that viewing distance the mini viewer, in conjunction with the lens in one's eyeball, projects an image onto one's retina. The effect is that one sees an image that appears as large as a cell phone display, yet comes from an opening about the size of the letter "o".

Figure 1:
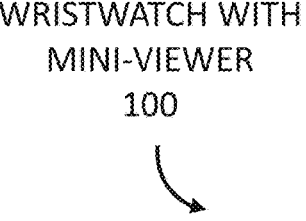
FIG. 1 shows a wristwatch including a display based on a femtoprojector.
Figure 1:
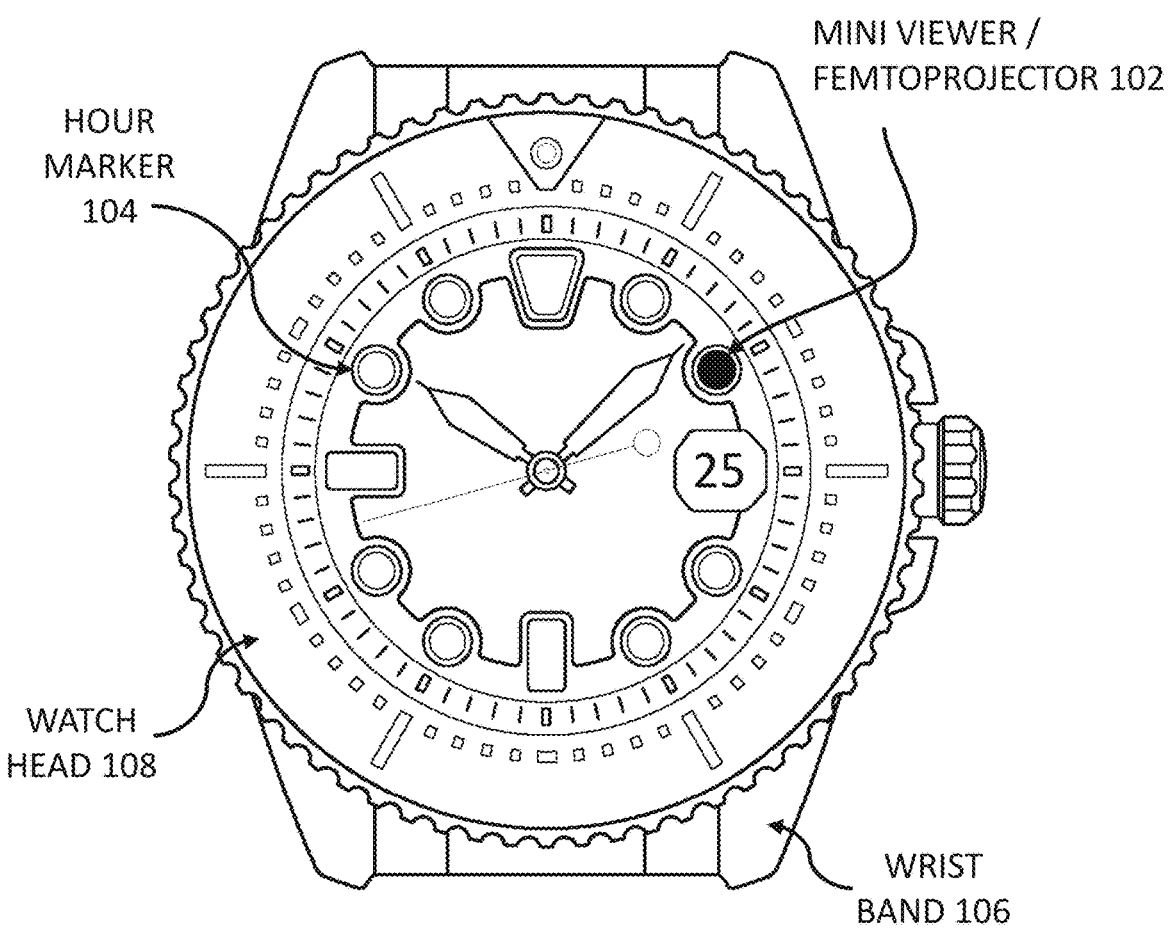

FIG. 1 shows a wristwatch 100 including a display based on a femtoprojector 102 (a "mini viewer"). The mini viewer 102 in this example is so small that it appears to be an hour marker 104 in a wristwatch 100. The mini viewer 102 may be as small as one or two millimeters in diameter. It is sealed inside the watch 100 and does not substantially change its appearance.

In a particular embodiment, a wristwatch 100 may include a wrist band 106 and a watch head 108, with display (e.g., a component of the femtoprojector 102) inset in the watch head 108. The femtoprojector 102 furthermore includes a window through which the display may be viewed from a position external to the watch head 108, and projection optics inset in the watch head 108 in an optical path between the display and the window. These projection optics may be structured to magnify images produced by the display such that projected images are focused on a retina of a person when viewed from a viewing distance within a range of zero to two inches. A battery internal to the watch head 108 may provide power to the display via a bus.

The display, the window, and the projection optics (that collectively make up the femtoprojector 102) are inset at a position of an hour marker 104 of the watch head 108. The watch head 108 also includes a plurality of other hour markers 104 that have substantially same size and shape as the window for the display.

Figure 2:
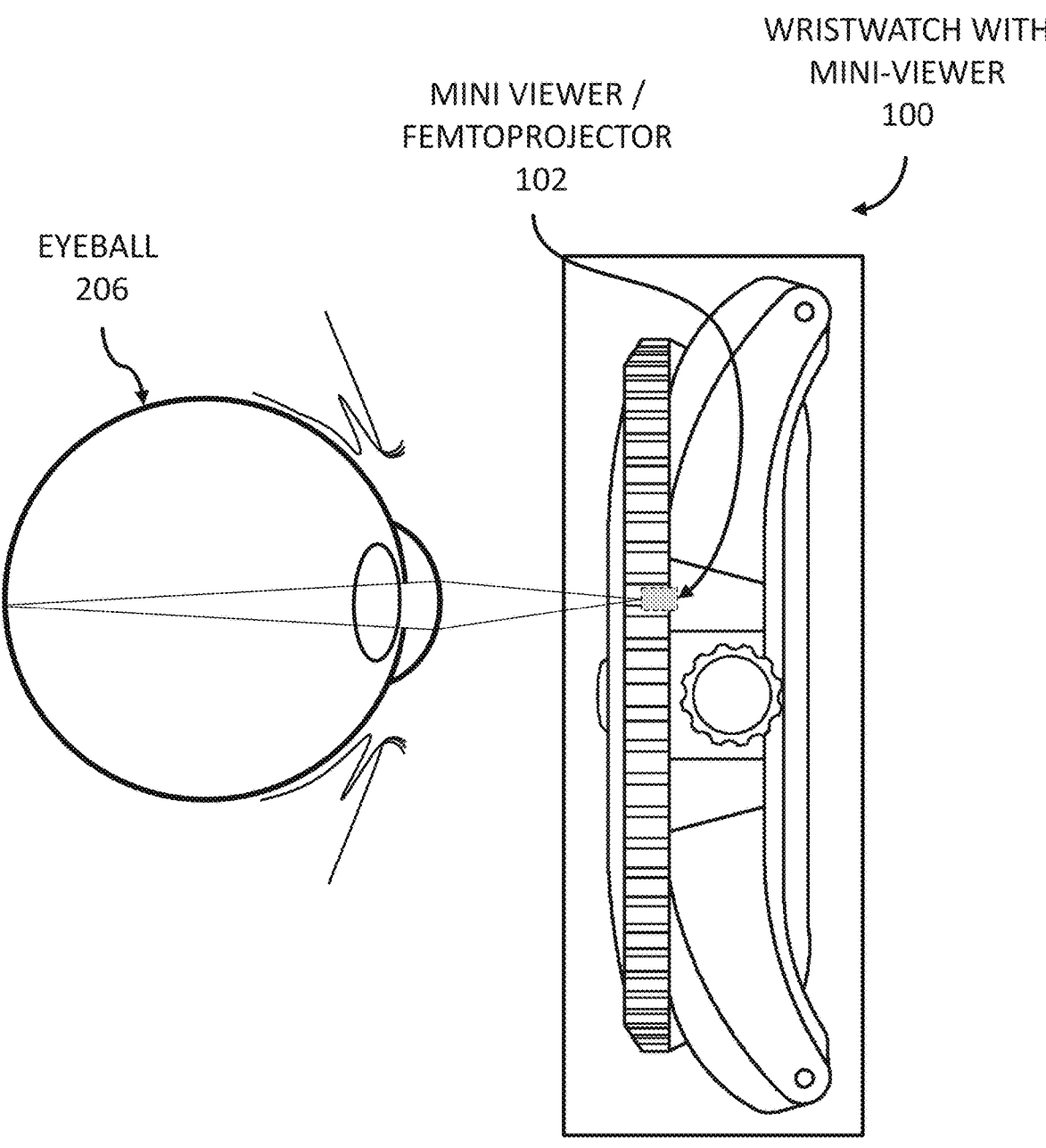
FIG. 2 illustrates an eyeball viewing a femtoprojector-based display in a wristwatch.

FIG. 2 illustrates an eyeball 206 viewing a femtoprojector-based display 102 in a wristwatch 100. The center of the eyeball 206 is about one eyeball diameter away from the mini viewer 102 in the watch 100. If the eyeball 206 were much farther away, then the projected image from the mini viewer 102 would be clipped at its edges by the pupil of the eyeball 206. If the eyeball 206 were much closer, then the projected image would be smaller and its features might not be resolvable given the limited density of photoreceptors in the retina. Thus, in one implementation, the projection optics of the femtoprojector 102 operate to produce the projected images to have a perceived image size that appear unclipped within an extent of a focal region of the retina and to have features of projected image that are resolvable by the retina when viewed from the viewing distance. Further details of a femtoprojector are described below.

Figure 3:
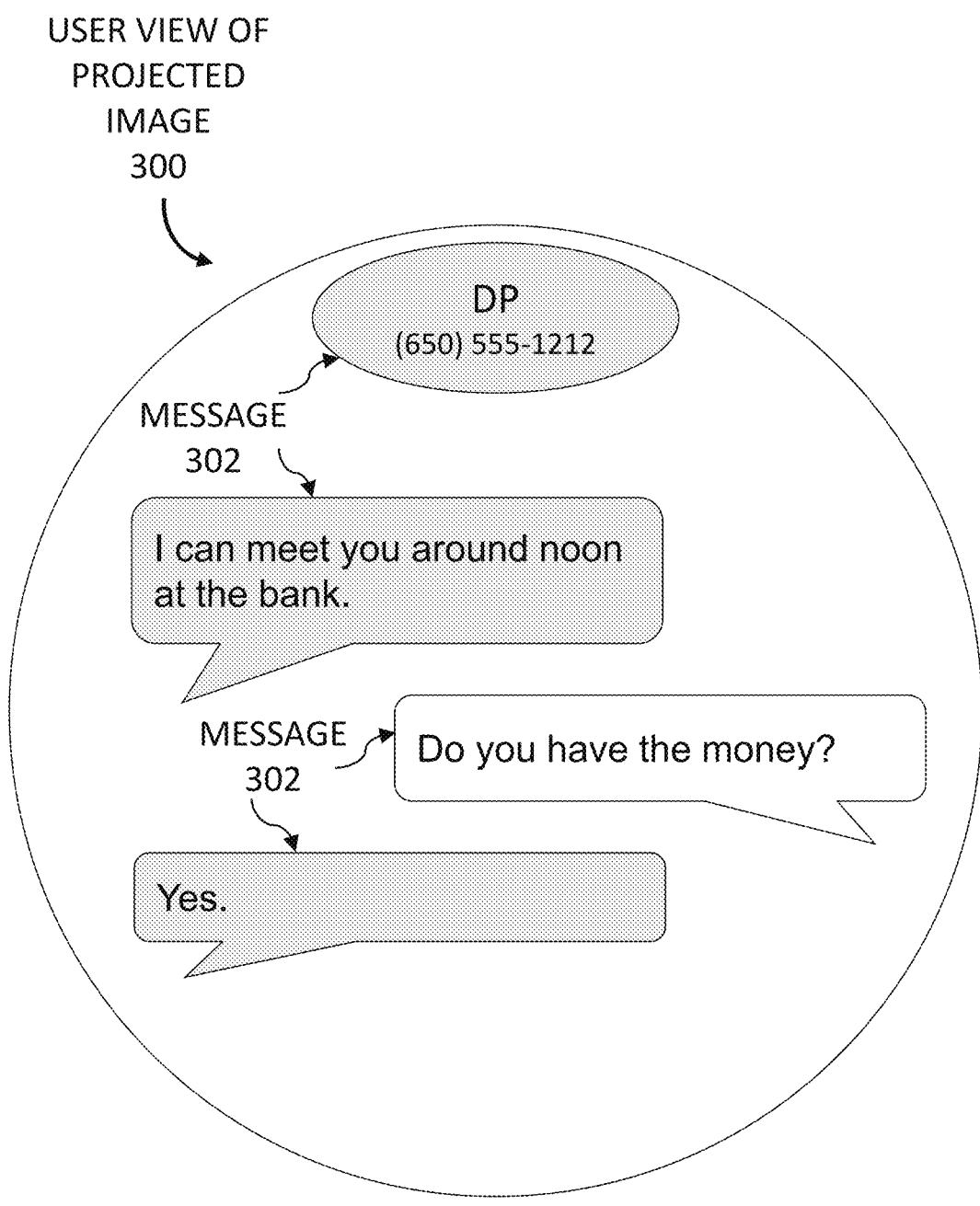
FIG. 3 shows a simulation of an image projected from a watch display.

FIG. 3 shows a simulation of an image 300 projected from a watch display. In the simulated image 300, text messages 302 to and from a contact named "DP" are shown. Examples of other kinds of images that might be shown include recorded greetings, battery level data, altimeter settings, heart rate data, caller ID, etc.

Figure 4:
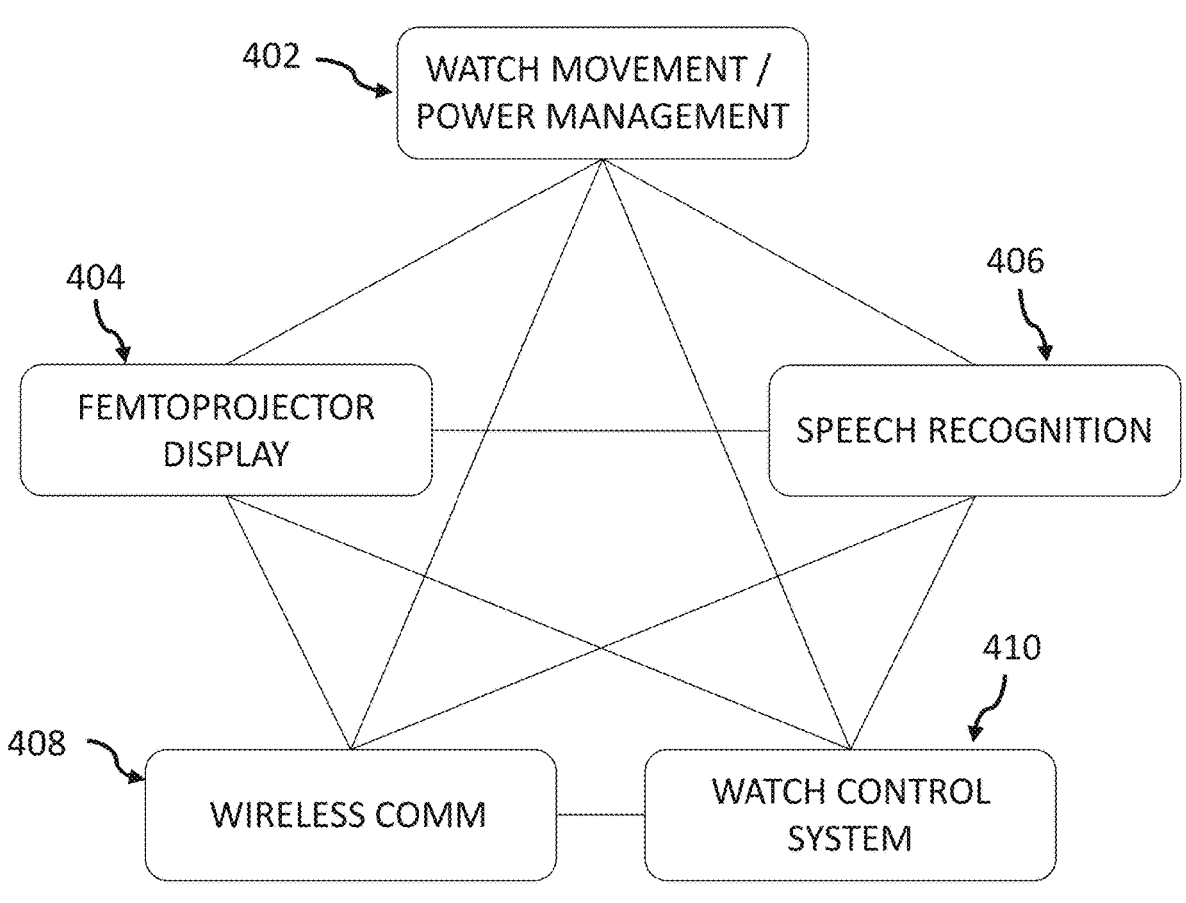
FIG. 4 is a diagram illustrating relationships between subsystems of a mini viewer.

FIG. 4 is a diagram illustrating a watch architecture 400 showing relationships between subsystems of a mini viewer 102. When a mini viewer 102 is incorporated in a watch 100 or other small electronic device, it is part of a system that may include features beyond basic image display. For example, in a watch architecture 400, the system includes the watch's movement and power management system 402. This system 402 may include batteries and a battery charging system. The watch architecture 400 may further include a speech recognition module 406 that may include a miniature microphone to detect sound and a speech recognition system to enable voice commands. Voice commands may include commands to display different information or voice-to-text dictation of messages, as examples. The watch architecture 400 also includes the femtoprojector display 404. It may include a microdisplay such as an ultra-dense LED array, a CMOS backplane to drive the LEDs, and projection optics. The display 404 may also include an optical window to seal out moisture, dust, etc. In some examples, a watch architecture 400 may include wireless communications 408 (e.g. Wi-Fi, Bluetooth, BLE, etc.). The watch movement and power management system 402, its speech recognition system 406, mini viewer/femtoprojector display 404, and wireless communications 408 are coordinated and controlled by a watch control system 410 which may include a general purpose microprocessor and/or an application specific integrated circuit. In addition, the watch architecture 400 may include other sensors, also in communication with, and controlled by, the watch control system 410. Examples of such sensors include temperature, barometric pressure, magnetic field, acceleration, angular rate, acoustic and micro-electromechanical systems (MEMS) sensors.

Figure 5:
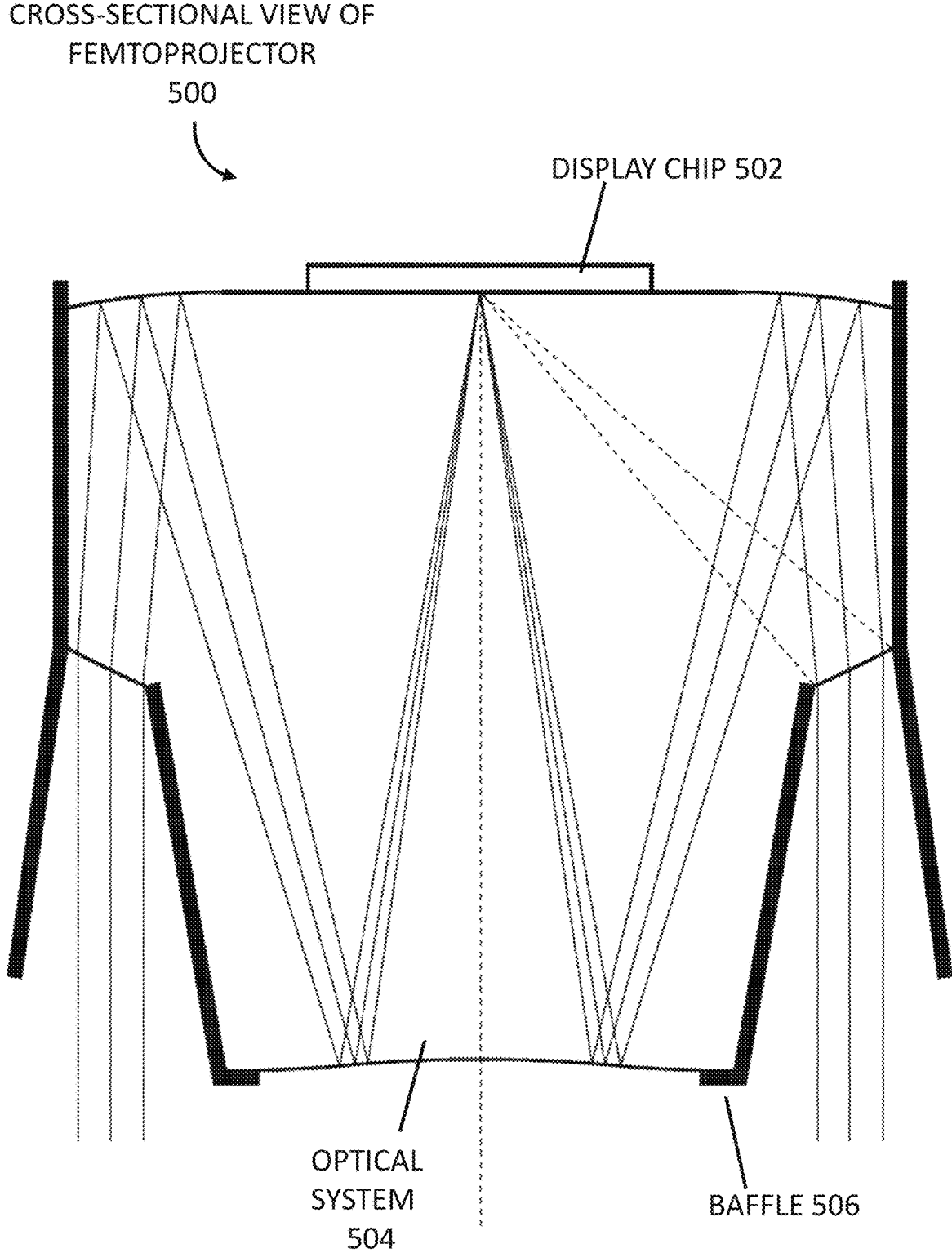
FIG. 5 is a cross-sectional view of a femtoprojector.
Figure 6A:
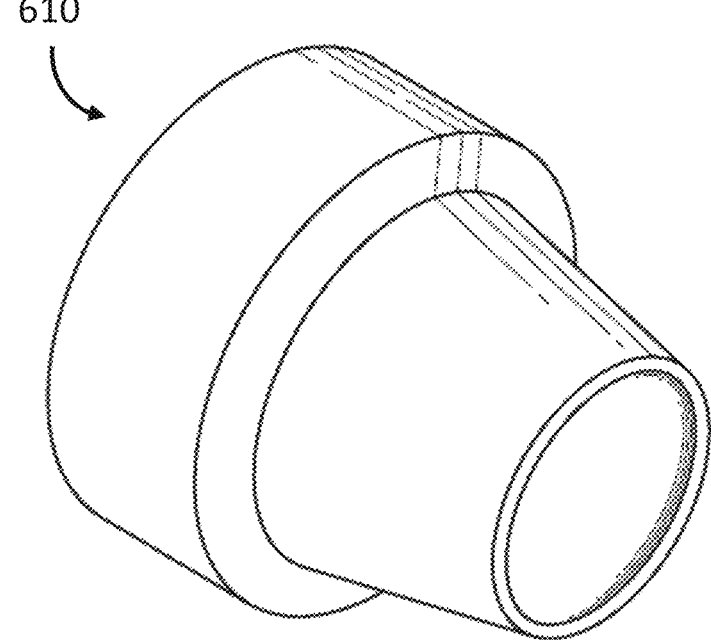
FIG. 6A and FIG. 6B are perspective views of femtoprojector optics.
Figure 6B:
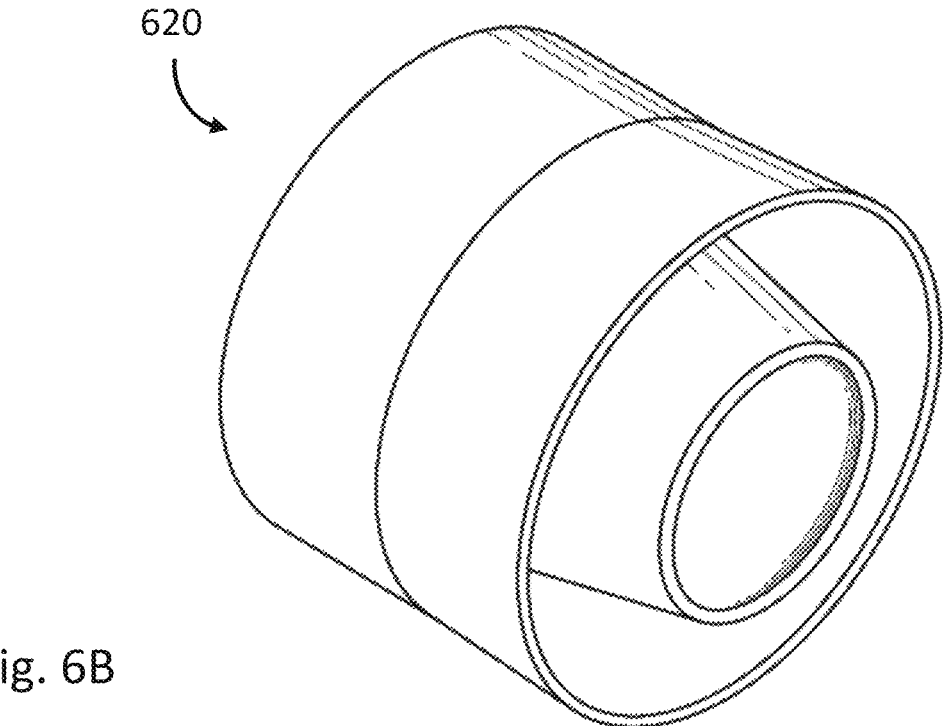

A femtoprojector optical system that may be employed as the femtoprojector display 404 may be designed as described in U.S. Pat. No. 10,613,334, "Advanced femtoprojector optical systems", to Lemoff and Mihalakis, which is incorporated by reference herein. FIG. 5, which is a cross-sectional view 500 of a femtoprojector, is reproduced from Lemoff and Mihalakis FIG. 3A. The system of FIG. 5 includes a display chip 502, an optical system 504 with primary and secondary curved mirrors, and absorbing baffles 506 which suppress stray light. FIG. 6A and FIG. 6B are perspective views of femtoprojector optics 610, 620. They are reproduced from Lemoff and Mihalakis FIGS. 4A and 4B. The femtoprojector 610 in FIG. 6A omits an external side baffle which is illustrated in the femtoprojector 620 of FIG. 6B.

Femtoprojector optics may also be implemented as a lens, or system of lenses, rather than as curved mirrors on opposite ends of a transparent, solid substrate.

Figure 7:
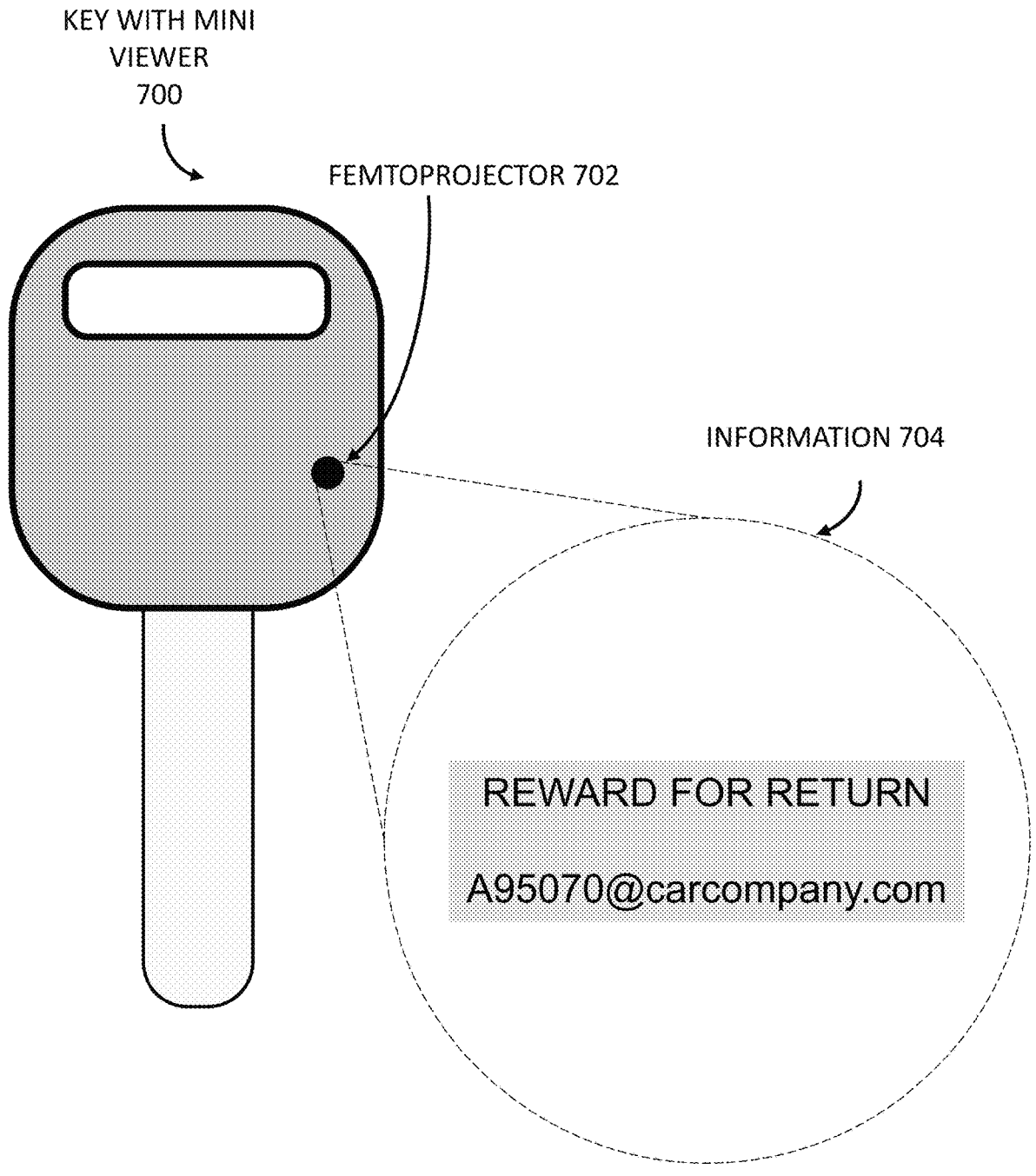
FIG. 7 shows a car key that includes a femtoprojector display.

FIG. 7 shows a car key 700 that includes a femtoprojector display 702. The key 700, or an electronic keyless fob, may include a mini viewer with a femtoprojector display 702. The display 702 may be powered by the same battery that powers the key, or by a dedicated battery. When held close to one's eye for viewing, the display 702 may show owner information, gas tank level, car battery charge state, a QR code for a website URL, or other information 704.

Figure 8:
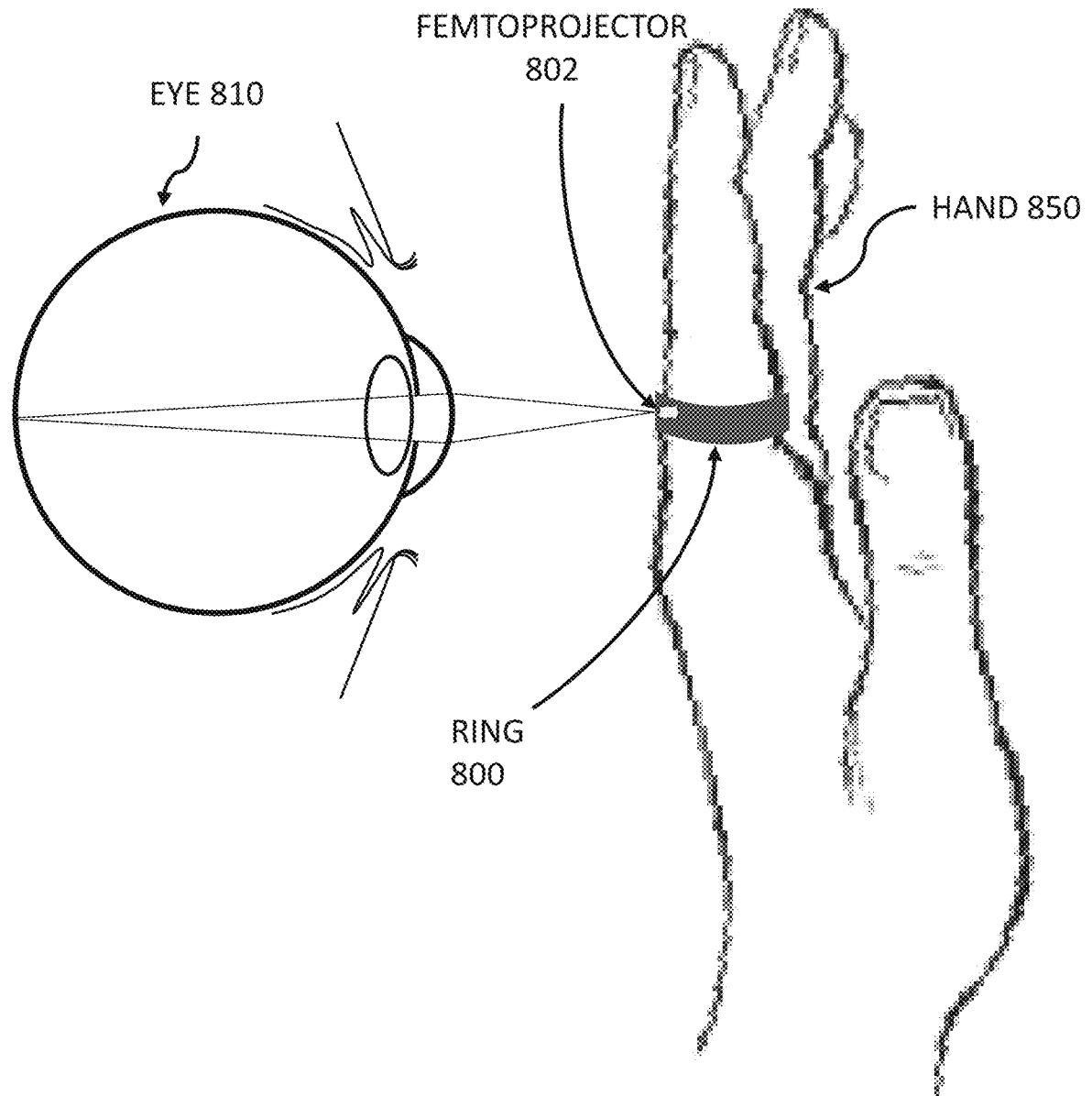
FIG. 8 shows a hand wearing a ring that contains a mini-viewer femtoprojector display.

FIG. 8 shows a hand 850 wearing a ring 800 that contains a mini-viewer femtoprojector display 802. The display 802 may be viewed by bringing the ring 800 within an inch or two of one's eye 810. The ring 800 may be worn anywhere around a finger, with the display 802 on either the back side, palm side, or thumb side of the finger.

Figure 9:
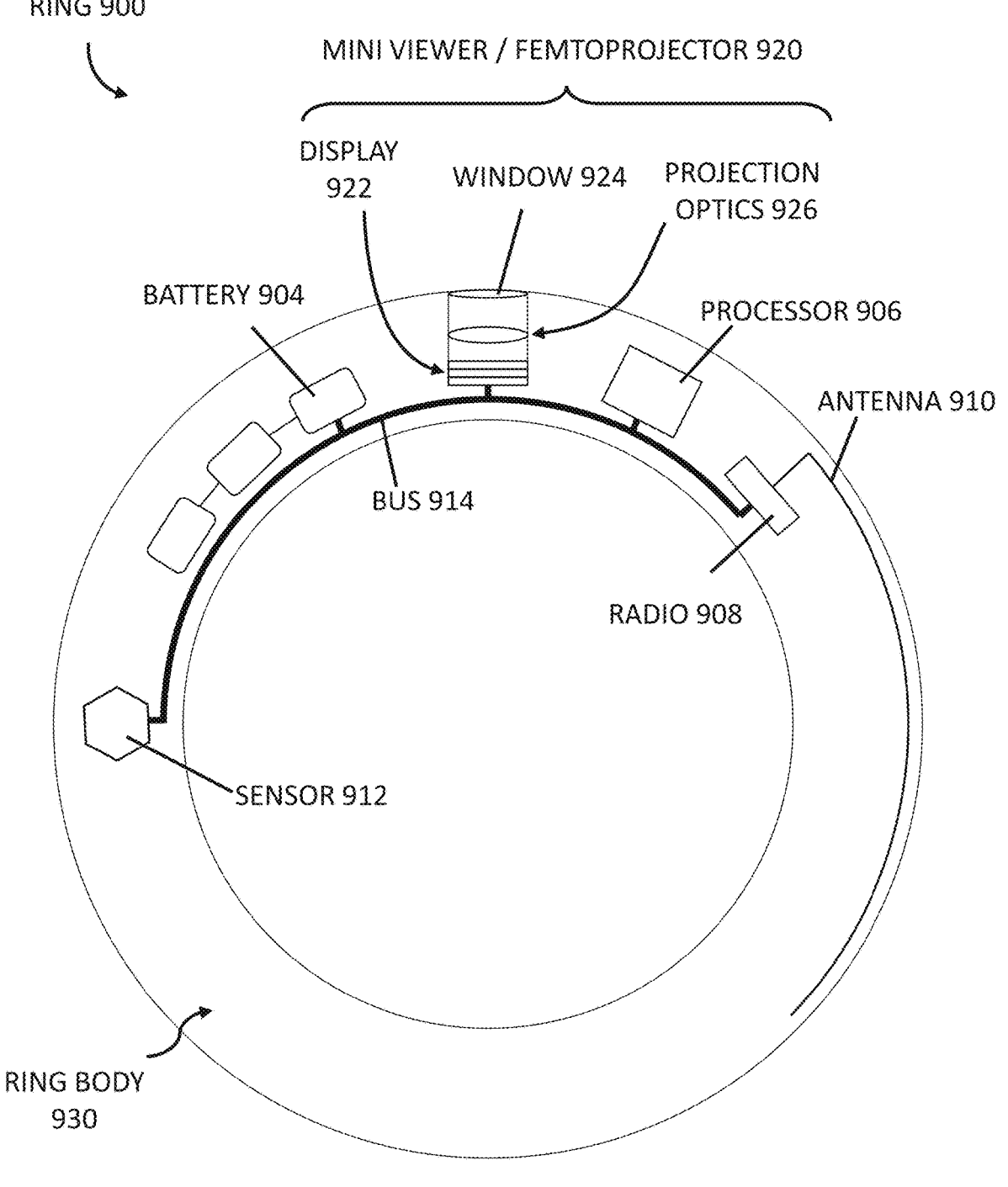
FIG. 9 is a diagram of components in a ring that contains a femtoprojector display.

FIG. 9 is a diagram of components in a ring 900 that contains a femtoprojector display 920, like the ring 800 shown in FIG. 8. One embodiment of a ring 900 includes a ring body 930 suitable for wearing on a finger; a display 922 inset in the ring body 930; a window 924 through which the display 922 may be viewed from a position external to the ring body 930; projection optics 926 inset in the ring body 930 in an optical path between the display 922 and the window 926, and a battery 904 internal to the ring body 930 which provides power to the display 922 via a bus 914. The projection optics 926 may be structured to magnify images produced by the display 922 such that projected images are focused on a retina of a person when viewed from a viewing distance within a range of zero to two inches.

The ring 900 may also contain a processor 906 internal to the ring body 930 and connected to the display 922 via the bus 914, where the processor 906 is capable of sending image data to the display 922 for rendering by the display 922.

The ring 900 may also contain a radio 908 and an antenna 910.

The battery 904 supplies electrical power to components in the ring 900 such as the display 922, processor 906, radio 908 and sensor 912. The battery 904 may be charged wirelessly or through conductive touch pads on the surface of the ring 900. The display 922 generates still or video images. The display 902 may be a micro-LED display and may be monochromatic or color. A color display may use quantum dots to convert some pixels of a monochromatic display into other colors. The display 922 may have a CMOS backplane coupled to a GaN LED layer. The LEDs may include GaN quantum wells. The display 922 may comprise an ultra-high density LED array having a display width of less than 2 millimeters Furthermore, the display 922 may comprise an ultra-high density LED array having a pixel pitch of less than 2 microns. In another embodiment, the display 922 may comprise an ultra-high density LED array having a pixel pitch of less than 12 microns.

Projection optics 926 magnify images of the display 922 so that it may be viewed from a distance of about zero to two inches or one or two inches. The projection optics 926 may operate to produce the projected images to have a perceived image size that appear unclipped within an extent of a focal region of the retina and such that features of projected image are resolvable by the retina when viewed from the viewing distance. For example the features may comprise text that is resolvable when viewed from the viewing distance. A transparent window 926 protects the display 922 from the outside environment. The window 924 may be part of the projection optical system 926 or it may be a planar window with no optical power.

A radio 908 may provide a data connection via Bluetooth, WiFi, BLE or other radio protocols. The radio 908 may be connected to an antenna 910 inside the ring 900 if the ring 900 is not conductive. Alternatively the ring 900, or segments of the ring 900 may act as a radio antenna. The radio 908 may be a receiver only, or both a transmitter and a receiver. The radio 908 may be integrated with the ring body 930 and connected to the processor 906 via the bus 914. The radio 908 may be capable of receiving radio data signals, wherein the processor 906 generates the image data based at least in part on the radio data signals.

The ring 900 may include a sensor 912 connected to the processor 906 via the bus 914. The sensor 912 may be capable of sensing a condition and sending sensor data characterizing the condition to the processor 906, wherein the processor 906 generates the image data based at least in part on the sensor data. The sensor 912 may comprise at least one of: a temperature sensor, a pressure sensor, a magnetic field sensor, an accelerometer, a gyroscope, an acoustic sensor, a micro-electromechanical systems (MEMS) sensor, a biometric sensor, an optical plethysmograph, a pulse oximeter, or a heart rate sensor. For example, the processor 906 may generate the image data to display biometric data derived from the sensor data.

The ring 900 may be coupled to a continuous glucose monitor. (Alternatively such a monitor may include a mini-viewer just as the watch, key, ring and other objects described herein may include a mini-viewer.)

A bus 914 provides a power and data connection between the battery 904 and the display 922, and other components that may be included in a ring 900 such as a processor 906, radio 908 and sensors 912. The processor 906 may receive sensor data over the bus 914, convert it into, for example, heart rate data or oxygen saturation data, and send image data over the bus 914 to the display 922 to show a user his heart rate or oxygen saturation level. The radio 908 may receive instructions via, for example, Bluetooth, and transfer the instructions to the processor 906 over the bus 914. Such instructions may include configuration information such as what sensor parameters to monitor and how often.

Some or all of the components of a mini-viewer 902 as shown in FIG. 9 may be included with mini-viewers in other objects such as watches, keys, or continuous glucose monitors. Additional kinds of objects that may include a mini-viewer are a pen, jewelry or a greeting card with a recorded video message in it. Many of these are small, personal and/or wearable objects.

The ring 800, 900 shown in FIGS. 8 and 9, is barely distinguishable from a standard ring, just as a key or a watch having a mini-viewer are difficult to tell apart from a conventional key or watch. Femtoprojector optics allow a person to view a small display that fits inside a watch, key, ring or other small object. Without the optics, it may be hard for a person to resolve displayed images without a microscope or magnifying glass.

A mini-viewer may bring modern display functions to watches of traditional appearance. It may serve as a display tag for small objects like keys. Or it may provide a display for a ring worn on a finger. Such a ring may sense parameters like a person's heart rate and display its results via a mini-viewer in the ring.

For example, as described above, an embodiment may include a handheld personal object, comprising: an object body having a form factor suitable for holding in a human hand; a display inset in the object body; a window through which the display may be viewed from a position external to the object body; projection optics inset in the object body in an optical path between the display and the window, the projection optics structured to magnify images produced by the display such that projected images are focused on a retina of a person when viewed from a viewing distance within a range of zero to two inches; and a battery internal to the object body which provides power to the display via a bus. The object body of the handheld personal object may comprise a watch, a key, a pen or a greeting card. Such an object body may be wearable. As described above, such an object may similarly have a display comprising an ultra-high density LED array having a display width of less than 2 millimeters, and projection optics that operate to produce the projected images to have a perceived image size that appear unclipped within an extent of a focal region of the retina and such that features (e.g., text) of projected image are resolvable by the retina when viewed from the viewing distance.

Upon reading this disclosure, those of ordinary skill in the art will appreciate still alternative structural and functional designs and processes for the described embodiments, through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the scope of the disclosure as defined in the appended claims.

What is claimed is:

1. A ring comprising:
a ring body suitable for wearing on a finger;
a display inset in the ring body;
a window through which the display may be viewed from a position external to the ring body;
projection optics inset in the ring body in an optical path between the display and the window, the projection optics structured to magnify images produced by the display such that projected images are focused on a retina of a person when viewed from a viewing distance within a range of zero to two inches, wherein the projection optics operate to produce the projected images to have a perceived image size that appear unclipped within an extent of a focal region of the retina and such that features of the projected images are resolvable by the retina when viewed from the viewing distance; and
a battery internal to the ring body which provides power to the display via a bus.

2. The ring of claim 1 further comprising:
a processor internal to the ring body and connected to the display via the bus, the processor capable of sending image data to the display for rendering by the display.

3. The ring of claim 2 further comprising:
a sensor connected to the processor via the bus, the sensor capable of sensing a condition and sending sensor data characterizing the condition to the processor, wherein the processor generates the image data based at least in part on the sensor data.

4. The ring of claim 3, wherein the sensor comprises at least one of: a temperature sensor, a pressure sensor, a magnetic field sensor, an accelerometer, a gyroscope, an acoustic sensor, a micro-electromechanical systems (MEMS) sensor, a biometric sensor, an optical plethysmograph, a pulse oximeter, or a heart rate sensor.

5. The ring of claim 3, wherein the sensor comprises a biometric sensor and wherein the processor generates the image data to display biometric data derived from the sensor data.

6. The ring of claim 2 further comprising:
a radio integrated with the ring body, the radio connected to the processor via the bus, and the radio capable of receiving radio data signals, wherein the processor generates the image data based at least in part on the radio data signals.

7. The ring of claim 1, wherein the display comprises an ultra-high density LED array having a display width of less than 2 millimeters.

8. The ring of claim 1, wherein the display comprises an ultra-high density LED array having a pixel pitch of less than 12 microns.

9. The ring of claim 1, wherein the features comprise text.

10. A handheld personal object, comprising:
an object body having a form factor suitable for holding in a human hand;
a display inset in the object body;
a window through which the display may be viewed from a position external to the object body;
projection optics inset in the object body in an optical path between the display and the window, the projection optics structured to magnify images produced by the display such that projected images are focused on a retina of a person when viewed from a viewing distance within a range of zero to two inches, wherein the projection optics operate to produce the projected images to have a perceived image size that appear unclipped within an extent of a focal region of the retina and such that features of the projected images are resolvable by the retina when viewed from the viewing distance; and a battery internal to the object body which provides power to the display via a bus.

11. The handheld personal object of claim 10 where the object body comprises a watch, a key, a pen or a greeting card.

12. The handheld personal object of claim 10 where the object body is wearable.

13. The handheld personal object of claim 10, wherein the display comprises an ultra-high density LED array having a display width of less than 2 millimeters.

14. The handheld personal object of claim 10, wherein the features comprise text.

15. The handheld personal object of claim 10, further comprising:

a processor internal to the object body and connected to the display via the bus, the processor capable of sending image data to the display for rendering by the display.

16. The handheld personal object of claim 15, further comprising:

a sensor connected to the processor via the bus, the sensor capable of sensing a condition and sending sensor data characterizing the condition to the processor, wherein the processor generates the image data based at least in part on the sensor data.

17. The handheld personal object of claim 16, wherein the sensor comprises at least one of: a temperature sensor, a pressure sensor, a magnetic field sensor, an accelerometer, a gyroscope, an acoustic sensor, a micro-electromechanical systems (MEMS) sensor, a biometric sensor, an optical plethysmograph, a pulse oximeter, or a heart rate sensor.

18. A wristwatch, comprising:

a wrist band;

a watch head including timekeeping elements;

a display inset in the watch head;

a window through which the display may be viewed from a position external to the watch head;

projection optics inset in the watch head in an optical path between the display and the window, the projection optics structured to magnify images produced by the display such that projected images are focused on a retina of a person when viewed from a viewing distance within a range of zero to two inches, wherein the projection optics operate to produce the projected images to have a perceived image size that appear unclipped within an extent of a focal region of the retina and such that features of the projected images are resolvable by the retina when viewed from the viewing distance; and a battery internal to the watch head which provides power to the display via a bus.

19. The wristwatch of claim 18, wherein the display, the window, and the projection optics are inset at a position of an hour marker of the watch head.

20. The wristwatch of claim 18, wherein the watch head includes a plurality of hour markers having substantially same size and shape as the window for the display.

* * * * *